(12) United States Patent
Wang (10) Patent No.: US 6,690,542 B1
(45) Date of Patent: Feb. 10, 2004

(54) DUAL MODULE RWW TAPE HEAD ASSEMBLY

(75) Inventor: Jianmin Wang, Fremont, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 113 days.

(21) Appl. No.: 09/995,730

(22) Filed: Nov. 29, 2001

Related U.S. Application Data
(60) Provisional application No. 60/255,769, filed on Dec. 13, 2000.

(51) Int. Cl.[7] .............................. G11B 5/10; G11B 5/11; G11B 5/60; G11B 15/64; G11B 17/32; G11B 21/20
(52) U.S. Cl. ........................................ 360/129; 360/231
(58) Field of Search ........................... 360/129, 130.32, 360/125, 122, 317, 313, 110, 231, 230

(56) References Cited

U.S. PATENT DOCUMENTS

| | | | |
|---|---|---|---|
| 4,809,110 A | 2/1989 | Hertrich | 360/122 |
| 4,853,814 A | 8/1989 | McClure | 360/122 |
| 4,875,129 A | 10/1989 | Favrou et al. | 360/122 |
| 5,034,838 A | 7/1991 | Brock et al. | 360/122 |
| 5,237,476 A | 8/1993 | Bischoff et al. | 360/126 |
| 5,307,227 A | 4/1994 | Okada et al. | 360/122 |
| 5,436,780 A * | 7/1995 | Nagata et al. | 360/121 |
| 5,774,306 A | 6/1998 | Wang et al. | 360/241.1 |
| 5,838,523 A * | 11/1998 | Okada | 360/122 |
| 5,883,770 A | 3/1999 | Biskeborn et al. | 360/130.21 |
| 5,905,613 A | 5/1999 | Biskeborn et al. | 360/130.21 |
| 5,953,184 A | 9/1999 | Barber et al. | 360/122 |
| 5,963,401 A | 10/1999 | Dee et al. | 360/316 |
| 6,038,108 A | 3/2000 | Dee et al. | 360/121 |

* cited by examiner

Primary Examiner—Julie Anne Watko
(74) Attorney, Agent, or Firm—McDermott, Will & Emery (57) ABSTRACT

A tape head assembly for high-speed and high-density multi-channel read-while-writing (RWW) operation comprises two modules bonded together. The modules are initially formed on an integral unit and gapped in pair, to produce a good reference surface, which insures that the finished head assembly will meet tight azimuth and gap tolerances. The unit is then machined to two separate the modules. Further processing involves individually machining the head surface of each module to achieve desired contours. The machined modules are tested and brought together in the positional arrangement required to form the final head assembly. In disclosed embodiments, the overall contour enables the assembly to skive air and debris off a surface of the magnetic tape before passage of the tape over the transducers. The contour allows the tape to fly over outriggers, but contacts regions at or around the transducers with a low constant contact pressure during RWW operation.

10 Claims, 4 Drawing Sheets

DUAL MODULE RWW TAPE HEAD ASSEMBLY

RELATED APPLICATION

This application claims the benefit of U.S. Provisional Application No. 60/255,769 entitled "Dual Module RWW Tape Head Assembly" filed on Dec. 13, 2000, the disclosure of which is entirely incorporated herein by reference.

FIELD OF THE INVENTION

The present invention relates to a dual module magnetic record/reproduce head assembly, in particular to such an assembly that is capable of a read while write (RWW) operation, and to a technique for constructing such a head assembly.

BACKGROUND

The subject matter discussed herein generally relates to magnetic tape drives and, more particularly, to a magnetic tape head and techniques for assembly thereof, wherein the tape head assembly has multiple transducer heads which together form a predetermined overall contour, for multi-channel, high speed read-while-write type recording. As a general matter, a magnetic tape drive includes a head assembly, which carries at least a pair of transducers for reading information from and writing information to a magnetic tape as the tape passes over the assembly. The head assembly is positioned between a pair of guide rollers, which guide the tape over the head assembly. The head assembly is offset from the guide rollers during operations, to cause the tape to wrap onto the head.

Modern magnetic tape recorders utilize a read while write (RWW) capability to store data on the tape and to confirm that the writing of data was error free. A read-while-writing head assembly includes a write head in-line with a contiguous read head. The gap of the read head is closely spaced to the gap of the write head, with the read head positioned downstream of the write head in the direction of tape motion during the writing operation. The recorder continually reads "just recorded" data throughout the write operation, to check correctness of the data at a time while the original data is still available in temporary storage in the recording system. The "just recorded" data is read and checked against the original data, and appropriate action is taken upon detection of error. Many modern tape systems also support bi-directional writing to the tape. As such, the systems require that the head elements support the RWW operation for both directions of tape travel.

The heads in these assemblies are carefully contoured to achieve desired degrees of wrapping of the tape around the head assembly, as the tape contacts and passes over the head assembly. The transducers are fabricated on a ferrite or other ceramic substrate using thin film wafer technology.

For example, U.S. Pat. No. 5,034,838 to Brock et al. discloses a bi-directional magnetic head assembly consisting of two write heads arranged on opposite sides of one read head, along the line of bi-directional movement of the tape. Each inductive write head consists of two abutting segments of a refractory non-magnetic material, with a gap line formed along the abutment (perpendicular to tape travel). The magnetoresistive read head consists of two half sections with magnetoresistive transducing elements located in the gap between those sections. In this assembly, the central read head is curved and has slots on either side of its transducing region for skiving of entrained air and debris from the tape before the tape engages the transducing elements of the read head from either direction of tape travel. Each write head has a single slot outboard of the respective transducing gap for skiving entrained air and debris.

U.S. Pat. No. 5,953,184 to Barber et al. discloses a three-head assembly with a common surface contour. The assembly from this Patent includes an interior tape head module having a magnetic gap for the thin film transducers, with transverse slots on each side of the gap to eliminate air and debris as the tape moves in either direction over the module. The assembly also includes two exterior tape head modules, one on each side of the interior module. Each exterior module has a magnetic gap containing the appropriate thin film transducer elements and transverse slots on each side of the gap.

U.S. Pat. No. 5,237,476 to Bischoff et al. discloses a technique for forming a thin film tape head assembly. The patented method involves depositing thin film transducers on a ceramic wafer or substrate, which is then divided into head bars. Each head bar has one or more of the thin film transducers on its face. End sections and a cover bar are joined to the head bar to form a head bar subassembly. A flexible cable or electrical pins between the end sections enable electrical connection between the transducers in the head and external circuitry. The patent also suggests joining a number of these head bar subassemblies in parallel (perpendicular to the travel of the tape), to form a multigap thin film tape head for multiple read/write operations.

The trends in development of magnetic tape drives involve ever-increasing demands for the density of data stored on the tape as well as ever-increasing requirements for speed. With these trends, it is reasonable to expect that the tape head assembly must be re-designed if it can not function adequately at newly required higher speeds and/or higher densities. To avoid the need to re-design the tape head, particularly the contour thereof, there is a need for a tape head assembly that can operate properly at current speeds and can reasonably be expected to continue to function properly at higher speeds in next-generation tape drives. Stated another way, it is desirable for a tape head assembly to operate over a wide range of tape speeds.

As shown by the cited examples, there have been many different designs for the tape heads of digital data storage type tape drives. In some applications, it may be acceptable to dispose of the tape drive and thus the head after a working life of about three years. However, there are applications where the life expectancy of the drive is projected to be much longer, hence there is a need for a head assembly design that has low wear during protracted use and therefore a long life expectancy.

Another trend relates to expectations of decreasing costs. The costs of computer equipment and other electronic devices have continually spiraled downward for almost two decades. To continue to meet the demand for ever better tape drives at ever lower costs, there is a need for a design of a tape head assembly and an attendant manufacturing technique that reduces costs yet yields a high percentage of products with increased performance capabilities.

The use of a tape head assembly in a cartridge type system, particularly for a single real tape cartridge drive also imposes certain special requirements on the tape head. For example, in the single real design, there is a substantial difference in tension on the tape between initial withdrawal of tape from the reel and that required near the end of the tape. As a result, the head assembly must function properly over a wide range of tape tensions, with attendant differences in wrap and contact pressure.

A tape head assembly also should have a relatively high tolerance to differences in wrap angle of the tape about the assembly. To maintain a tight angle tolerance, the components of the drive must be built to very tight tolerances making the drive excessively expensive. If the wrap angle tolerance is relatively wide, the tolerances of other drive components are not as strict, and those components can be manufactured using less expensive techniques.

SUMMARY OF THE INVENTION

The inventive concepts meet the above noted needs for the structure and assembly of heads for read-while-writing (RWW) type magnetic tape systems. A tape head assembly, in accord with the aspects of the present invention, comprises two modules bonded together, for example, in a back-to-back arrangement. However, the initial phase of the manufacturing technique produces a single unit containing elements of both modules, for example, in a head-face to head-face arrangement. Transducer elements for both modules may be formed initially on different halves of a single substrate that is common to both modules.

The modules are initially gapped in pair, in order to produce a good reference surface, which insures that the head will meet tight azimuth and gap distance tolerances in a low cost assembly process. The unit is then machined to separate the modules, essentially to cut the integral unit into two halves forming the individual modules. The inventive assembly technique then entails individually machining the head surface of each separate module, to achieve desired contours. Each module may be separately tested before final assembly. The machined modules are then brought together in the positional arrangement required to form the final head assembly.

Hence, one aspect of the invention relates to a magnetic tape head assembly, for use with a magnetic recording tape passing thereover. The assembly includes at least two transducers. One of the transducers is for writing data to the magnetic tape, and the other transducers is for reading data from the tape during a read-while-writing operation, for example, as the tape travels in one direction over the assembly. In preferred embodiments, if the tape travels in the opposite direction, the functions of the two transducers are reversed. As such, the assembly preferably supports bi-directional operation. The assembly also includes means for mounting the transducers to form a composite assembly of two head modules. These means also provide a predetermined working contour for the assembly, enabling high-speed and high-density read-while-writing operation.

In disclosed embodiments, the contour enables the assembly to skive air and debris off a surface of the tape before passage of the tape over the transducers. The contour allows the tape to fly over a portion of the contour, and facilitates contact of the tape to a region of the contour including transducers with a low constant contact pressure during the read-while-writing operation.

A preferred embodiment of the assembly comprises a first module and a second module attached to each other, for example, in a back-to-back arrangement. Each module comprises an element chip, having one or more thin film transducer elements. In each module, a cover bar is bonded to an outer or front surface of the element chip. The tape facing surfaces of the modules are machined to have mirror-image contours, such that when the inner or back surfaces of the units are bonded together (to achieve the back-to-back arrangement), the mirror-image contours of the two modules form a substantially contiguous working contour for the assembly.

In this assembly, each working contour comprises an element bump around the respective transducer elements, a pair of grooves on opposite sides of the element bump, and a pair of outriggers. In a preferred embodiment, the contour also includes a central notch around the bound line between the two modules. Portions of the tape facing surfaces of the wafer chips and the cover bars are machined to a common radius of curvature on each module. In the preferred embodiment, the radial dimension is the same, although when assembled, the arcs have different center points.

Another aspect of the invention relates to a method for constructing a magnetic tape head assembly. This inventive method involves forming a pair of transducer elements on a common thin film tape head wafer chip and attaching the thin film tape head wafer chip to a double-width cover bar to form an intermediate assembly. The intermediate assembly is cut in two, to form two separate modules, each of which includes a chip containing one set of transducers and a cover bar. The formation of two modules in one integral intermediate assembly increases manufacturing speed and makes the components, which are larger, easier to handle. Also, the surface of the cover bar serves as a reference surface, insuring that the opposing surface(s) of the resulting module are substantially planar.

The inventive method then entails machining tape facing surfaces of the semiconductor wafer chip and the cover bar, of each of the separate modules. This machining step produces separate mirror-image working contours on the two modules. Each separate working contour comprises an element bump, grooves on opposing sides of the element bump, and an outrigger adjacent to each groove. Two modules, formed and machined in this fashion, are then bonded together in back-to-back relation. In this arrangement, the mirror-image working contours together form a substantially contiguous working contour for the head assembly.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
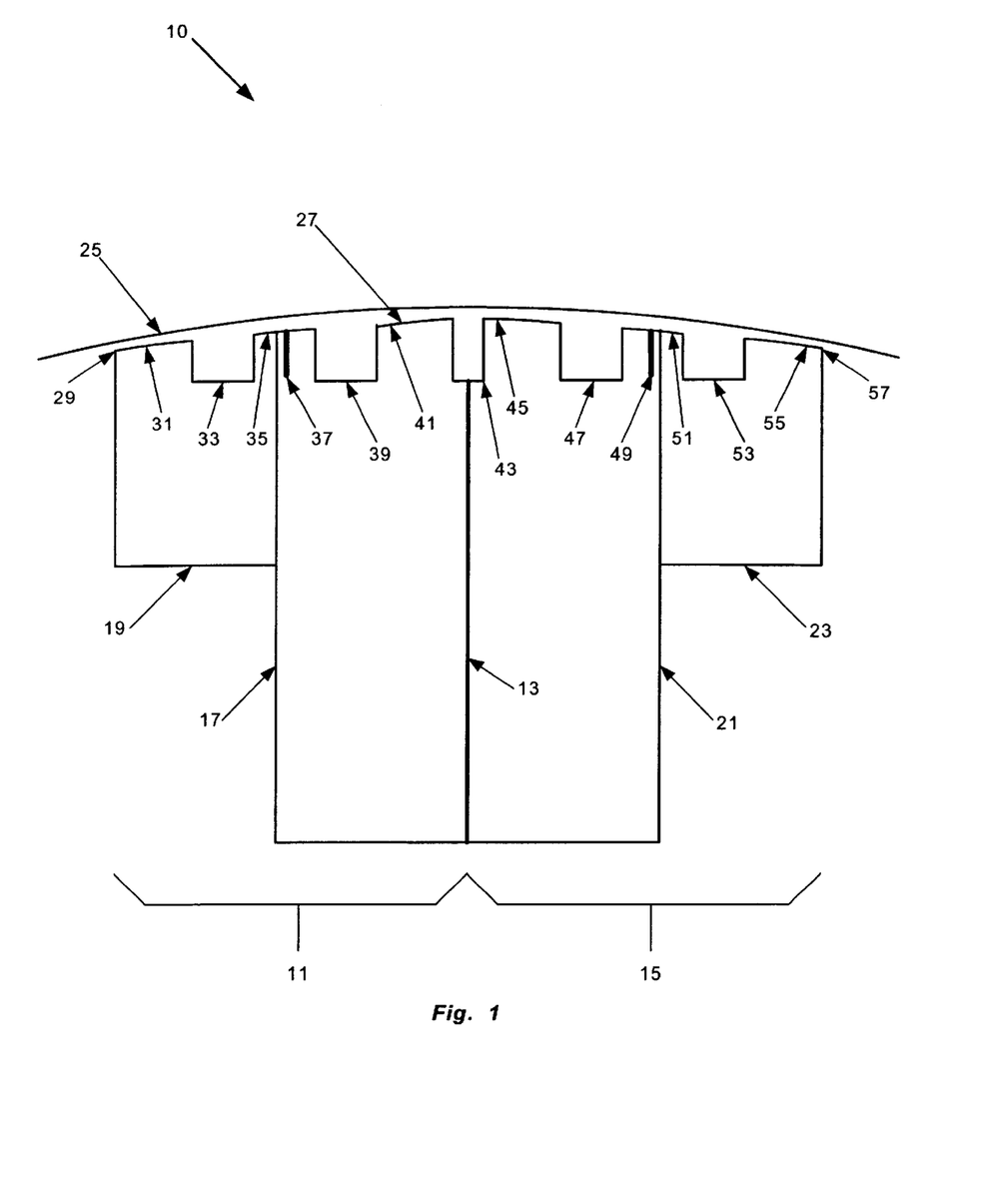
FIG. 1 is a substantially enlarged cross-section view, taken in the transverse region of the actual transducers, of a dual module read-while-writing tape head assembly in accord with an inventive embodiment.

The various embodiments disclosed herein relate to the structure of a read-while-writing (RWW) tape head assembly and/or to techniques for manufacturing such an assembly. Reference now is made in detail to the presently preferred embodiments, examples of which are illustrated in the accompanying drawings and discussed below. In the example, it is assumed that the assembly processes a ½ inch tape. Exemplary dimensions relate to an assembly for use with the ½ inch tape. Those skilled in the art will recognize the adaptability to other sizes of magnetic tape although the head dimensions will likely change. FIG. 1 shows the structure of the assembly, and the other drawings illustrate an inventive series of steps for manufacturing the tape head assembly in a cost-effective manner.

Hence, FIG. 1 shows the profile (in cross-section) of an exemplary embodiment of an RWW head assembly 10 with an advantageous contour profile. The view corresponds roughly to a cross-section taken through a central portion of the assembly, including through the element chips and the transducers supported by those chips. The drawing is considerably enlarged for ease of viewing and is not drawn to scale. An actual embodiment of such an assembly, intended for example for processing the ½ inch tape, is 3.15 mm wide and approximately 2.35 mm high.

The head assembly 10 includes two head modules 11 and 15, which are essentially mirror images of each other. Although initially constructed as separate units, the two modules 11 and 15 are joined back-to-back along a plane or bound line 13, for example by means of an epoxy or other adhesive. The epoxy used to bond two modules can be any type of epoxy, as long as it meets the strength requirements. Although not readily distinguishable at 13 in the drawing, the material between the two modules may include a thin metal sheet with epoxy on each side to bond the metal to the respective surface of each module. Such a thin metal sheet provides an electrical shield between the modules and helps to minimize cross-feed between the modules.

The left head module 11 comprises a left wafer chip 17 and a left cover bar 19. Similarly, the right head module 15 comprises a right wafer chip 21 and a right cover bar 23. The cover bars 19 and 23 are blocks of AlTic material and are bonded to outer surfaces (away from the bond line 13) of the wafer chips 17, 21. In this example, the cover bar, filler blocks and wafer are all formed of the same material and wear at the same rate. Obviously other materials could be used.

The wafers 17 and 21 are thin film wafer chips or element chips supporting the transducers and associated circuitry in the central region of the assembly 10. Although not visible in the cross-section view, the assembly also includes filler blocks of wafer substrate material on either transverse side of the wafer chips, as will be apparent from other drawings discussed later. The thin film (about 0.05 mm thick), which contains the read/write transducer elements, is deposited on the AlTic wafer substrate (originally about 2 mm thick and then back-grinding to 0.76 mm thick). The thin film of the transducer is formed of Alumina (filler) and NiFe (pole tips) on the AlTic wafer chip. The filler blocks are made from the same material as the wafer substrate, that is to say AlTic.

In operation, a tape 25 passes over a working contour of the tape bearing surface (TBS) 27 of the head assembly 10. When the tape 25 moves over the tape head assembly 10 at a high speed, the movement creates an air-bearing effect due to the air trapped between the tape and the head. The assembly 10 is pressed into the path of the tape to partially wrap the tape 25 around the head assembly along the contour of the TBS surface 27. Although shown separated by a small distance, for ease of illustration, the tape 27 will contact portions of the contour of the TBS 27 as the tape passes over the head assembly 10 during read-while-writing operations. At certain points of contact, relatively high pressures are desirable, for example to help to skive the air, to skive and thereby entrain loose debris in certain slots in the assembly, and/or to scrap stick debris from the areas around the transducer elements. However, to insure long life, it is equally desirable that the contact pressure in the areas at and immediately adjacent to the transducer elements are relatively low, that is to say, so as to prevent excessive wear on the relatively soft transducer materials.

The inventive RWW head assembly 10 supports bi-directional operations. As such, one head module 11 or 15 is the leading head and performs the write operations as the tape moves in one direction, and the other head module 11 or 15 is the trailing head and performs the read operations as the tape moves in the same direction. The transducer functions are reversed to enable similar read-while-writing (RWW) operations in the opposite direction of tape travel.

Each module 11, 15 has a working contour, and together those contours form the contour of the tape bearing surface (TBS) 27 of the head assembly facing toward and in some cases contacting the tape 25. Portions of the tape facing surfaces of the cover bars 19, 23 and preferably the chips 17, 21 have a common radius of curvature, for example around 6 mm. The preferred embodiment of the assembly 10 has a machined radius of 6.22 mm for the curved outer surfaces, along the TBS surface area 27. However, when assembled, the surfaces of the two modules do not have the same arc. When they have been bonded together, their radius centers are not at the same point.

In the embodiment, the contour of the TBS 27 is carefully designed to enable high-speed and high-density read-while-writing type operations. For example, each sharp edge combined with an appropriate contact pressure will skive or squeeze air and debris off the tape surface before passage over one or both of the transducer elements 37 and 49. This helps to maintain tape contact to the appropriate portions of the head during operation. The inventive contour design also reduces air bearing surfaces facing toward the tape 25, to reduce air bearing effects that otherwise prevent tape fly over the gap area, especially at low tension.

As noted, the assembly 10 may be used for bi-directional RWW operations. For discussion purposes, the operation for tape travel from left to right will be considered in detail, although those skilled in the art will recognize that the assembly will function in a mirror-image manner for RWW on a tape travelling from right to left in the illustrated orientation.

As shown in FIG. 1, the contour of the TBS surface 27 of the head assembly 10 includes a first edge 29. In an operation in which the tape 25 passes from left to right over the contour 27, hence, the tape 25 passes or flies over edge 29 and lands on the first outrigger 31. The outrigger 31 is formed as an outer rail of the left head module 11, in this case in the surface of the left cover bar 19. The contour of the TBS surface 27 next includes a groove 33 in the surface of the left cover bar 19. The groove 33 forms the first of several transverse slots in the head assembly 10, which are useful in storing and removing debris.

The first element bump 35 is adjacent to the groove 33. The left element bump 35 is formed of a portion of the cover bar 19 and the wafer chip 17 of the left module 11. The wafer chip 17 includes a first set of thin film read/write transducer elements 37. The set of transducer elements may include any number of elements, but on a preferred embodiment the set 37 includes 16 read/write elements for data and 4 servo transducer elements. The thin film for the coil and/or core of each of the transducer elements is formed of Alumina (filler) and NiFe (pole tips) on the wafer chip 17. Preferably, the elements of the transducer set 37 support multi-channel read and write operations. The contact pressure is relatively high at the edges of the bump 35, to insure removal of debris and air. However, because of the curvature of the outermost tape facing surfaces of the TBS 27, the contact pressure at and around the transducer set 37 is relatively low and constant. The materials of the actual transducer elements tend to be relatively soft, and low contact pressure tends to reduce wear and thereby extend the working life of the assembly 10.

The first transducer set 37 extends through the portion of the element bump 35 formed in the wafer chip 17 to the surface of the bump 35, for operative contact with the tape as it passes over the contour of the TBS surface 27 of the assembly 10. In an actual embodiment, the bump 35 is 0.267 mm wide. The transducer set 37 preferably is approximately in the center of the bump 35, as shown in FIG. 1, although this may not be as readily apparent from some of the other drawings since the assembly is not drawn to scale. In an exemplary embodiment for use with a ½ inch tape, the left transducer 37 is located 0.749 mm outward from the back or inner surface of the wafer 17 shown as bound line 13.

The contour of the TBS surface 27 includes a second groove 39 adjacent to the bump 35, followed by an inner rail 41. Within the head module 11, for example during pre-assembly testing of the module 11, the rail 41 appears as a second outrigger. The groove 39 and the outrigger 41 are formed in the surface of the left wafer substrate 17, that is to say in the chip of the left head module 11. The groove 39 and outrigger 41 extend transversally across the chip 17 as well as across the adjacent filler blocks (shown later).

The contour of the facing surfaces of the outrigger 31, the bump 35 and the outrigger 41 allow the tape 25 to fly over the outriggers. However, the tape 25 contacts the portion of the bump 35 at the magnetic gap area, that is to say at and around the vicinity of the left transducer set 37, with a low constant contact pressure. As the tape travels in one direction, a leading one of the edges of the bump 35 skives off air and skives debris off into the adjacent groove. The reason for this is to prevent air and debris from getting into the head-tape interface. Otherwise air or debris lifts the tap from the head to cause read/write performance failure. For example, as the tape 25 travels from left to right, the first edge of the bump 35 skives debris off into the groove 33. As the tape 25 travels from right to left, the second edge of the bump 35 skives debris off into the groove 39. Contact pressure at these edges tends to be high as compared to the constant low contact pressure at the magnetic gap area.

The contour of the TBS surface 27 of the head assembly 10 also includes a central slot 43, although this slot is optional. In the preferred embodiments, the slot 43 is approximately 0.15 mm wide. An actual embodiment has been constructed, for example, with a 0.152 mm wide middle slot 43. The slot 43 allows a certain tolerance in the assembly of the two modules 11 and 15 and reduces the need for accuracy of assembly. Without the presence of the slot 43, it would be necessary to perfectly align the two modules, so that the bound 13 did not form a sharp edge in the TBS surface 27. The slot 43 also serves as a reservoir for any excess epoxy used at the joint along the bound line 13, to bond the two modules 11 and 15 together to form the assembly 10. Any exposure of epoxy to the surface of the tape 25 would cause undesirable contamination.

The portion of the contour 27 formed in the face of the module 15 includes a third outrigger, in the form of another rail 45. The contour of the module 15 next includes a third groove or slot 47. The outrigger 45 and the groove 47 are formed in the surface of the wafer chip 21 of the right module 15, and these elements function in a manner similar to the outrigger 41 and the groove 39 formed in the face of the chip 17 of the left module 11. The outrigger 45 and the groove 47 extend transversally across the chip 17 as well as across the adjacent filler blocks (shown later)

Adjacent to the groove 47, the contour of the TBS surface 27 includes a second element bump 51. The bump 51 extends from chip 21 into cover bar 23. The right element bump 51 is formed of a portion of the cover bar 23 and the wafer chip 21 of the right module 21. The wafer chip 21 includes a second set of thin film read/write transducer elements 49. Like the set 37, the set 49 may include any number of elements, but preferably includes 16 for data and 4 for servo functions. The thin film for the core and/or coil of each of the transducer elements is formed of Alumina (filler) and NiFe (pole tips) on the wafer chip 21. Preferably, the elements of the transducer set 49 support multi-channel read and write operations. The contact pressure is relatively high at the edges of the bump 51, to insure removal of debris and air. However, the contact pressure at and around the transducer set 49 is relatively low and constant due to the curvature of the outermost tape facing surfaces of the TBS 27. Again, it is significant to note that this low pressure extends the life expectancy of the assembly by reducing wear on the relatively soft elements of the transducers The second transducer set 49 extends through the portion of the element bump 51 formed in the wafer chip 21 to the surface of the bump 51, for operative contact with the tape as it passes over the contour of the TBS surface 27 of the assembly 10. In an actual embodiment, the bump 51 is 0.267 mm wide. The transducer set 49 preferably is approximately in the center of the bump 51, as shown in FIG. 1, although this may not be as readily apparent from some of the other drawings since the assembly is not drawn to scale. In the embodiment constructed in accord with the invention, the right transducer set 49 is located 0.749 mm outward from the back or inner surface of the wafer 21 shown as bound line 13.

Adjacent to the element bump 51, the contour 27 next includes a fifth transverse groove or slot 53 and an outrigger 55, formed in the surface of the right cover bar 23. The slot 53 is similar to the slot 33. The outriggers 31 and 55 stabilize the tape and control wrap angles over the element bumps 35 and 51. Assuming the tape 25 moves from left to right, for discussion purposes, the TBS 27 ends in a trailing edge 57 formed on the right cover bar 23. The tape 25 contacts outrigger 55, but it flies over the edge 57.

The contour of the facing surfaces of the outrigger 45, the bump 51 and the outrigger 55 allows the tape 25 to fly over the outriggers. However, the contour is such that the tape contacts the surfaces at the magnetic gap area, that is to say at and around the vicinity of the transducer set 49, with the desired low constant contact pressure. As the tape travels in one direction, a leading one of the edges of the bump 51 skives off air from the tape surface and skives debris off into the adjacent groove. For example, as the tape 25 travels from left to right, the first edge of the bump 51 skives debris off into the groove 47. As the tape 25 travels from right to left, the second edge of the bump 51 skives debris off into the groove 53. Contact pressure at these edges is relatively high to facilitate debris and air removal and thereby prevent the air and debris from getting to the tape-head interface, which will lift the tape off the head.

Adjusting the width and locations of the slots 33, 39, 47 and 53, and adjusting the radius of the contour, optimizes the contact pressure at the edge of each element bump 35 or 51. As noted earlier, the preferred machined radius, for the curved outer surfaces along the contour of the TBS surface 27, is 6.22 mm. In the preferred embodiments, the grooves or transverse slots 33, 39, 47 and 53 are approximately 0.30 mm wide. An actual embodiment has been constructed, for example, with 0.318 wide slots on opposite sides of each of two 0.267 mm element bumps. The dimensions of that embodiment are given herein as examples, not as limitations on the dimensions of assemblies within the scope of any of the present inventions.

As outlined above, it should be apparent that contact pressure at the edge of the bumps 35 or 51 is set higher than in the middle of each bump, where the respective read/write transducer device 37 or 49 is located. However, with the illustrated contour of the TBS surface 27, the tape does not make an even contact pressure across the entire element bump because the materials (Alumina and NiFe) at the thin film gap are not as tough as the wafer substrate and cover bar material (AlTic), which also comprises most of the TBS area. Wear test results indicate that the edges of the bumps 35 and 51 are rarely worn off during the lifetime of the assembly 10.

The contour of the TBS surface 27 is designed to have a head/tape spacing of less than 50 mm and work at tape speeds of up to 6 m/s within a tape tension range of 0.5–1.5 N (for example, for a ½ inch wide tape) at a wrap angle in the range of 9–11 degrees.

In the discussion above, it was sometimes assumed that the tape moved from left to right. The contours of the modules 11 and 15, however, are substantially mirror images. As such, a tape 25 will pass over the combined contour 27 from right-to-left, and the elements of the contour will function in substantially the same manner as described above relative to the left-to-right motion. When the tape moves from left to right, the transducer 37 functions as the write head, and the transducer 49 performs the associated read head operation. When the tape moves from right to left, the transducer 49 functions as the write head, and the transducer 37 performs the associated read head operation.

Figures 2, 3, 4, 5:
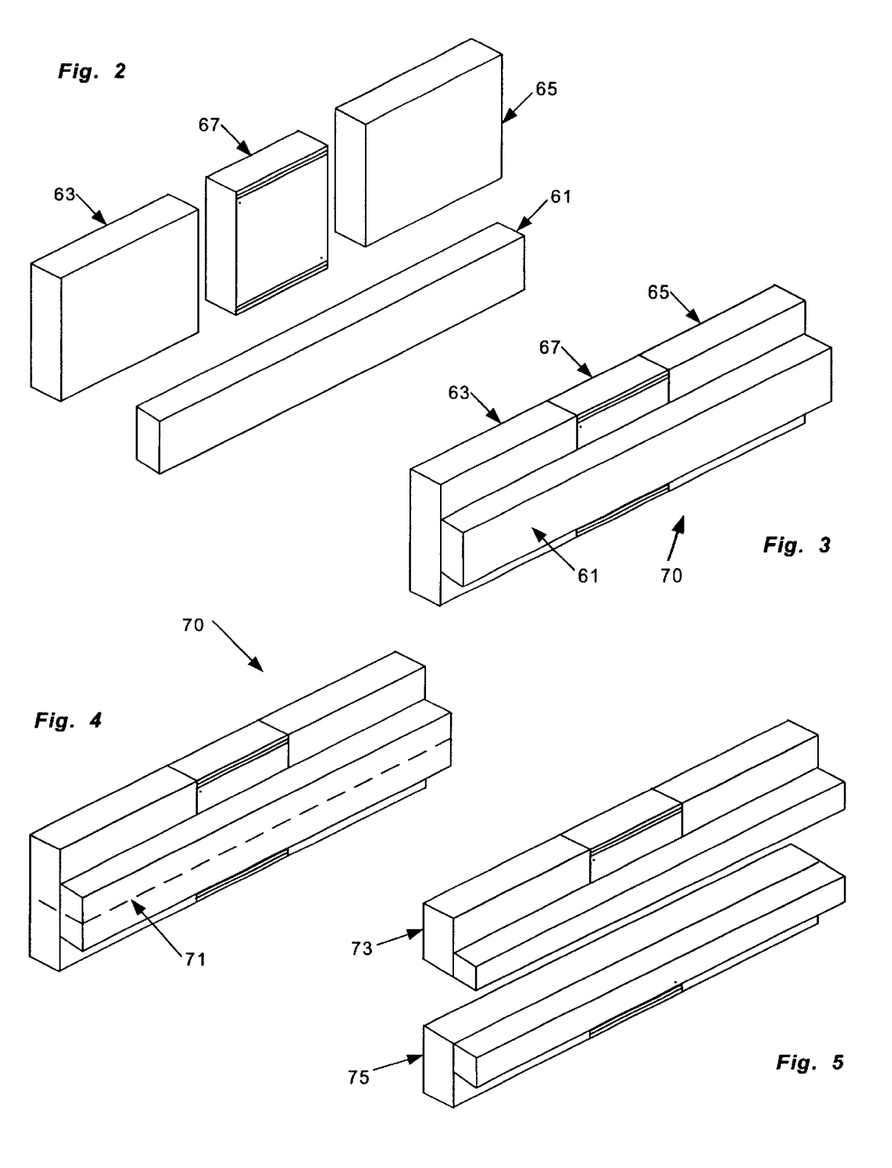
FIGS. 2 through 5 are isometric views representing a series of the steps in an inventive method for manufacturing the tape head assembly of FIG. 1.

FIG. 2 shows the separate components used to construct the two modules of the tape head assembly 10. As shown the pre-assembly components include an unseparated cover bar 61, which is a block formed of AlTic. The block 61 is essentially double-width (shown in the vertical dimension), in that it contains the material for ultimately forming the two cover bars 19, 23.

In the embodiment, the necessary transverse length of the assembly is wider than the minimum required transverse length of the transducer elements. The transducers could extend the full length of the assembly in the transverse direction, or the wafer could include blank sections (without transducers) to provide the desired length. However, it is preferred to use filler blocks on opposite sides of the wafer(s) that supports the transducer elements.

Hence, the pre-assembly components also include a left filler block 63 and a right filler block 65, formed of the same materials as the substrate of the wafer chip, that is to say AlTic. The components also include a paired wafer or element chip 67. Transducer elements for both modules are initially formed on different halves of a double-width wafer chip 67. The transducer elements are formed on the wafer using known thin film deposit processing techniques. Specifically, the wafer chip 67 includes the thin film transducer elements in a paired or mirrored configuration, so that later slicing of the wafer 67 down the middle will produce two separate wafer chips (17, 21 as shown in FIG. 1) with the necessary transducer elements in the desired positions for the two separate head modules. The filler blocks 63 and 65 and the wafer chip 67 also are essentially double-width (shown in the vertical dimension), in that they contain the material for ultimately forming the chip and associated filler blocks for two separate modules.

The filler blocks 63 and 65, and chip 67 are laid on the cover bar 61, first, with an epoxy therebetween. The cover bar 61 provides a flat reference surface, so that the other three parts 63, 65 and 67 can be bonded together in the same plane. Before the adhesive hardens, the filler blocks 63 and 65 are pushed from their outside edges towards the center and against the sides of the element chip 67, so as to minimize the gaps between the filler blocks and element chip. An epoxy may be applied between the ends of the wafer element chip 67 and the ends of the filler blocks 63 and 65. In this manner, the elements 61, 63, 65 and 67 come together and are bonded together, so as to form an intermediate assembly 70. Hence, the modules are initially gapped in pair, in the face-to-face arrangement shown in FIG. 3. Such processing of the integral unit 70 produces a good reference surface, at the bonds to the cover bar block 61, which insures that the opposite surfaces of the filler bars 63, 65 and the wafer chip 67 (away from the cover bar 61) also are substantially planar. These coplanar opposite surfaces will become the inner facing surfaces of the two modules when the modules are later joined together at the boundary. As a result of this processing of the integral unit 70, in its finished form the head assembly 10 will meet tight azimuth and gap distance tolerances in a low cost assembly process.

These steps allow time savings during manufacturing, because two modules are processed at the same time. Also, the larger elements shown in FIGS. 2–4 are easier to handle than would be the smaller elements, if each module were assembled from pre-cut components.

These initial phases of the manufacturing technique produce a single unit 70 containing elements of both modules, for example, in a head-face to head-face orientation across an intended dicing line 71, as shown in FIG. 4. The unit 70 is then machined along the line 71 to separate the modules, essentially to cut the integral unit into two halves forming the individual modules in intermediate form, shown as subassemblies forming un-contoured modules 73 and 75 in FIG. 5.

Figure 6:
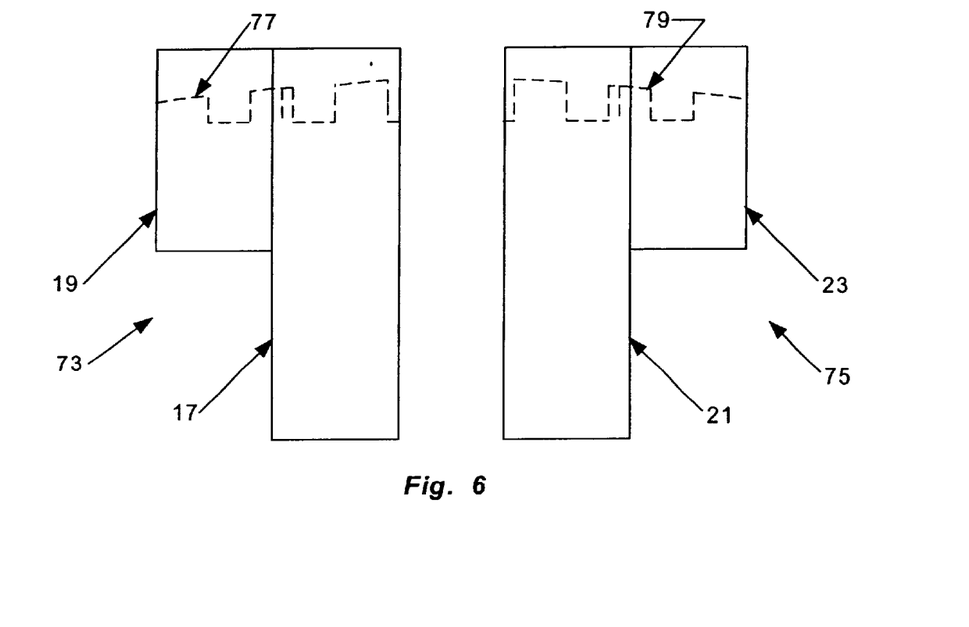
FIGS. 6 through 8 are somewhat enlarged end views useful in understanding the further steps for completing the inventive method for manufacturing the tape head assembly.

FIG. 6 shows two such mirror-imaged units, separated and oriented approximately as intended for use in the final assembly of FIG. 1. At this point, it can be clearly seen that the unfinished unit 73 includes the wafer chip 17 and the cover bar 19, and the unfinished unit 75 already includes the wafer chip 21 and the cover bar 23. The surfaces of the units 73 and 75 intended to face toward and/or contact the tape have not yet been machined to the desired contours. The dotted line 77 represents the machining contour desired for the left module 73. Similarly, the dotted line 79 represents the machining contour desired for the right module 75. The degree of machining necessary to reduce the faces of the modules 73 and 75 to reach the desired contours 77 and 79 is somewhat exaggerated in the drawing, for the ease of viewing and understanding.

Figure 7:
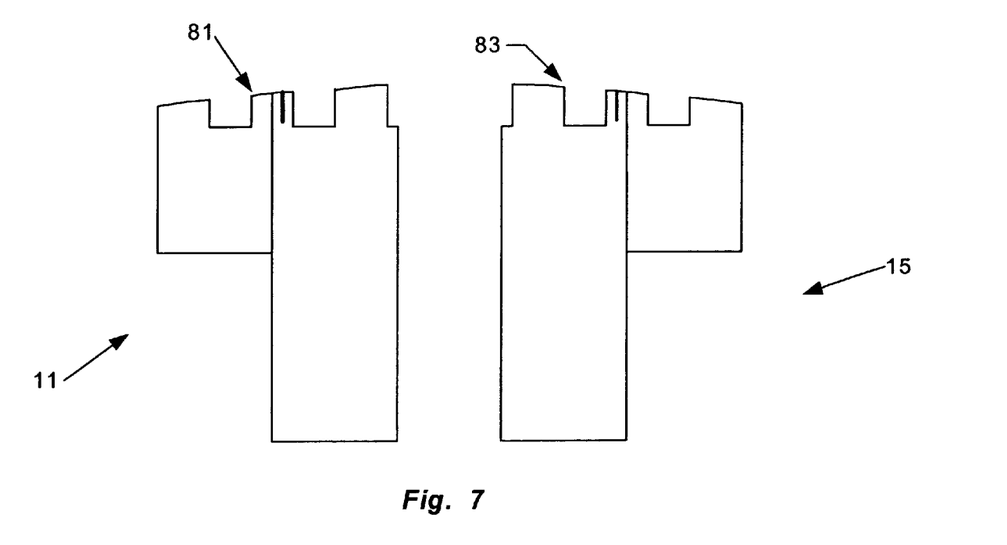

The assembly technique then entails individually machining the head surface of each separate module 73 and 75, to achieve desired contours 81 and 83, as shown in FIG. 7. In this machining process, the adjacent portions of the filler blocks are machined in the same manner as the wafer chips, such that the wafer chips and filler blocks form continuous contours when viewed in the transverse direction. In this manner, the subassemblies essentially become individual finished modules 11 and 15. Each module 11, 15 has a working contour 81, 83. In the direction of tape travel, the working contours 81, 83 include the outriggers, grooves and element bumps, needed for the respective finished modules, as discussed above relative to FIG. 1. Each of the working contours 81, 83 also includes a notch at the junction of the contour and the back surface of the respective module, so as to form the central notch when the two modules are bonded together. As shown, the module 11 and its associated working contour 81 are substantially mirror images of the module 15 and the associated working contour 83.

Figure 8:
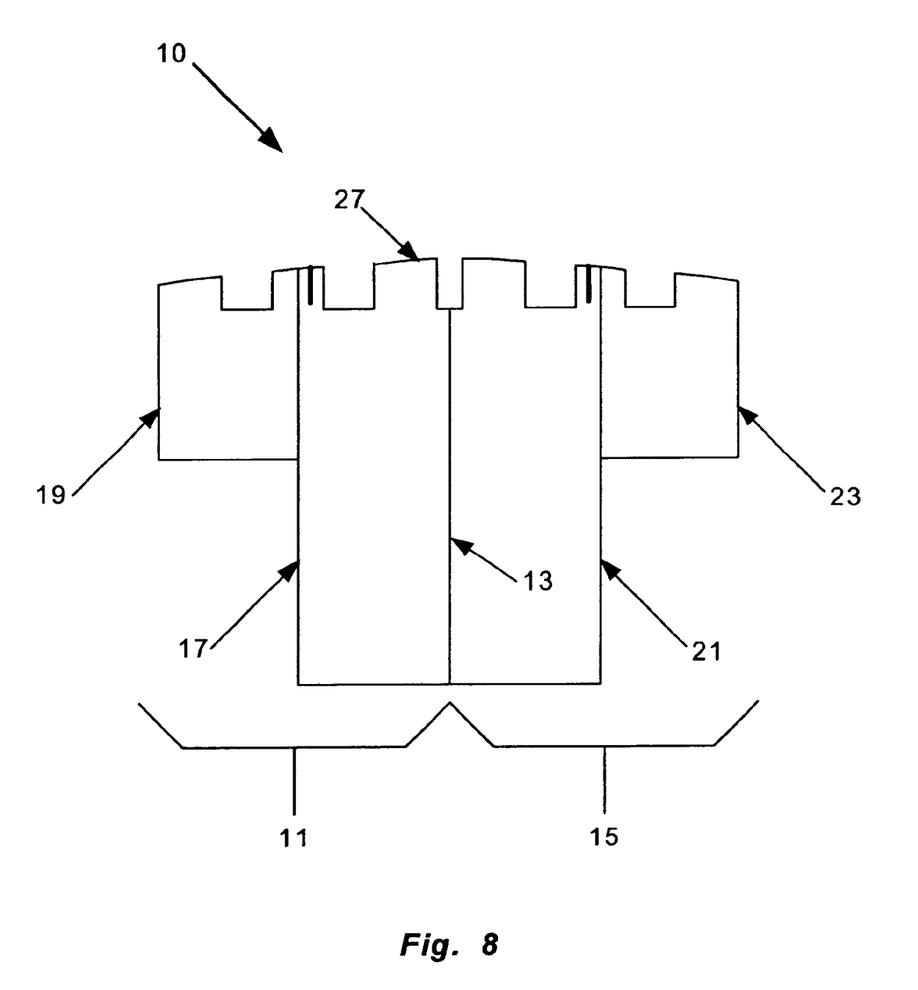

At this point, each module 11, 15 is a complete head having a working contour 81, 83 and properly positioned transducer elements. As a result, each module 11, 15 may be separately tested before final assembly. Because the modules may be tested at this stage, if one module is bad, only that one module is discarded. In contrast, head assemblies tested after all heads are glued together must be discarded if even only one head is bad. The ability to test the head modules separately before final assembly therefore increases overall yield with respect to finished assemblies and decreases the volume of discarded material In an actual manufacturing process, the steps represented by drawing FIGS. 2–7 produce substantial numbers of the separate head modules 11 and 15. The modules 11 and 15 are tested, and the acceptable modules sorted into left modules 11 and right modules 15. A pair of the machined and tested modules 11, 15 are then selected and brought together in the positional arrangement required to form the final head assembly 10, as shown in FIG. 8. In most instances, the selected modules 11 and 15 will not be the same pair that was formed together from the common elements 61, 63, 65 and 67 in the earlier steps.

In the preferred embodiment, the modules 11 and 15 are attached together in back-to-back relation to each other by means of a bonding agent, such as an epoxy, at the interface 13. Other means may be used to attach the modules in the back-to-back arrangement. Because the modules were assembled using the common reference surface provided by the bar 61, the back or inner surfaces of the wafer chips 17 and 21 are substantially planar and parallel along the bound line 13. As a result, the surfaces bond well together without substantial tension or misalignment.

As noted earlier, the material between the two modules 11, 15 may include a thin metal sheet (not separately visible) with epoxy on each side to bond the metal to the respective surface of each module. Such a thin metal sheet provides an electrical shield between the modules and helps to minimize cross-feed between the modules. The sheet would be inserted at 13, during the final assembly/epoxy processing.

As assembled, the separately machined contours of the modules 11 and 15 (FIG. 8) are contiguously joined together to form the desired overall contour 27 for the head assembly 10. The assembly technique provides a relatively high-yield yet is relatively inexpensive to perform.

While the foregoing has described what are considered to be the best mode and/or other preferred inventive embodiments, it is understood that various modifications may be made therein and that the inventions may be implemented in various forms and embodiments, and that it may be applied in numerous applications, only some of which have been described herein. It is intended by the following claims to claim any and all modifications and variations that fall within the true scope of the inventive concepts.

What is claimed is:

1. A magnetic tape head assembly for use with a magnetic recording tape passing thereover, the assembly comprising:

a first module and a second module attached to each other, the first module comprising:

a first wafer chip comprising a first thin film transducer element;

a first cover bar bonded to an outer surface of the first wafer chip; and a first contour forming tape facing surfaces of the first wafer chip and the first cover bar, the first contour comprising an element bump around the first thin film transducer element, a pair of first grooves with one first groove being located on each side of the element bump, and a pair of first outriggers with one first outrigger being adjacent to each of the first grooves;

the second module comprising:

a second wafer chip comprising a second thin film transducer element;

a second cover bar bonded to an outer surface of the second wafer chip; and a second contour forming tape facing surfaces of the second wafer chip and the second cover bar, the second contour comprising an element bump around the second thin film transducer element, a pair of second grooves with one second groove being located on each side of the element bump, and a pair of second outriggers with one second outrigger being adjacent to each of the second grooves; wherein:

the first and second modules are bonded together in a back-to-back arrangement at inner surfaces thereof, the first and second contours form a substantially contiguous working contour for the assembly, in the bonded arrangement, and the contiguous working contour comprises a central groove substantially at a location where the first and second modules are bonded together.

2. The magnetic tape head assembly as in claim 1, wherein at least portions of the tape facing surfaces of the first and second cover bars have a common radial dimension.

3. The magnetic tape head assembly as in claim 2, wherein the common radial dimension is 6 mm.

4. The magnetic tape head assembly as in claim 1, wherein at least portions of the tape facing surfaces of the first and second wafer chips and the first and second cover bars have a common radius of curvature.

5. The magnetic tape head assembly as in claim 4, wherein the common radius of curvature is 6 mm.

6. The magnetic tape head assembly as in claim 1, wherein the first element bump comprises a portion of the first cover bar and a portion of the first wafer chip, and the first thin film transducer element is located substantially in the center of the first element bump; and the second element bump comprises a portion of the second cover bar and a portion of the second wafer chip, and the second thin film transducer element is located substantially in the center of the second element bump.

7. The magnetic tape head assembly as in claim 1, wherein:

the contiguous working contour allows the tape to fly over certain portions of the working contour, and the contiguous working contour facilitates contact of the tape to the first and second element bumps at a read-write gap area with a low constant contact pressure during a read-while-writing operation.

8. The magnetic tape head assembly as in claim 1, further comprising a thin metal sheet, disposed between the inner surfaces at the bond between the first and second modules, for providing an electrical shield between the modules.

9. The magnetic tape head assembly as in claim 1, wherein:

each module further comprises filler blocks attached to a respective one of the cover bars adjacent opposite transverse ends of a respective one of the wafer chips; and tape facing surfaces of the filler blocks of each respective module have a contour substantially corresponding to the contour of the tape facing surfaces of the respective wafer chip.

10. The magnetic tape head assembly as in claim 1, wherein the first and second contours are substantially mirror images of each other.

* * * * *